US008583486B2

(12) United States Patent
YoungLincoln

(10) Patent No.: US 8,583,486 B2
(45) Date of Patent: Nov. 12, 2013

(54) ADVERTISING AND WEB SITE FEEDBACK SYSTEMS AND METHODS

(75) Inventor: Tracy B. YoungLincoln, Atlanta, GA (US)

(73) Assignee: 22squared, Atlanta, GA (US)

( * ) Notice: Subject to any disclaimer, the term of this patent is extended or adjusted under 35 U.S.C. 154(b) by 0 days.

(21) Appl. No.: 13/333,741

(22) Filed: Dec. 21, 2011

(65) Prior Publication Data

US 2013/0166375 A1     Jun. 27, 2013

(51) Int. Cl.
*G06Q 30/00*     (2012.01)

(52) U.S. Cl.
USPC ...................................... 705/14.45; 705/14.41

(58) Field of Classification Search
USPC ........................................... 705/14.41, 14.45
See application file for complete search history.

(56) References Cited

U.S. PATENT DOCUMENTS

| | | | |
|---|---|---|---|
| 2010/0251128 A1* | 9/2010 | Cordasco ..................... | 715/736 |
| 2011/0055214 A1* | 3/2011 | Mui et al. ..................... | 707/737 |
| 2011/0055250 A1* | 3/2011 | Nandy et al. ................. | 707/769 |
| 2011/0082858 A1* | 4/2011 | Yu et al. ....................... | 707/727 |
| 2011/0087542 A1* | 4/2011 | Kamath ...................... | 705/14.43 |
| 2011/0119374 A1* | 5/2011 | Ruhl et al. ..................... | 709/224 |
| 2011/0184814 A1* | 7/2011 | Konkol et al. ............. | 705/14.69 |
| 2011/0313920 A1* | 12/2011 | Trickel .......................... | 705/40 |
| 2011/0320395 A1* | 12/2011 | Dada et al. ..................... | 706/47 |
| 2012/0036008 A1* | 2/2012 | Robertson et al. ......... | 705/14.43 |

\* cited by examiner

*Primary Examiner* — Thomas L Mansfield, Jr.
*Assistant Examiner* — Sujay Koneru
(74) *Attorney, Agent, or Firm* — Brient Intellectual Property Law, LLC

(57) ABSTRACT

This disclosure relates to systems for aggregating and communicating media data, which may include advertising-related data and web site data. In various embodiments, the system includes a display showing the respective bounce rates associated with web site traffic received from multiple different traffic sources. The system may also indicate how many users (for example, from one or more particular traffic sources) execute one or more desired actions during their visit to the web site. This may allow an advertiser to quickly assess the performance of each component of an advertising campaign, and to modify the campaign to increase its effectiveness and to reduce the overall cost of the advertising campaign by discontinuing or modifying ineffective components of the campaign.

18 Claims, 11 Drawing Sheets

ADVERTISING AND WEB SITE FEEDBACK SYSTEMS AND METHODS

BACKGROUND

Modern marketing campaigns commonly include running a variety of different types of advertisements that operate together to drive a desired customer behavior (e.g., the purchase of a particular product, such as an automobile). Such advertisements may include, for example, television and radio advertisements, conventional print advertising (e.g., newspapers, magazines, and direct mail), e-mail advertising, billboards, and online advertising. Online advertising may include various forms of advertisements, such as web site banner ads, advertisements placed in online video content (e.g., online videos and video game play), keyword-generated search results advertisements, and the like. Online ads may take the form of audio, video, images, and/or text in order to vary the types of content in an effort to target receptive audiences.

Because each different component of a marketing campaign requires money, time, and effort to maintain, it is desirable for advertisers to be able to quickly assess the effectiveness of each component of the campaign in producing the desired customer behavior. Unfortunately, there is currently no adequate system for doing so.

In light of the above, there is currently a need for a system that: (1) quickly determines which particular components of a marketing campaign are the most successful in producing a particular type of customer behavior; and (2) displays this information to a user in a format that doesn't take an excessive amount of time to understand. Such a system would be useful in allowing advertisers to quickly adjust their marketing campaign to maximize its effectiveness and to minimize the costs associated with the campaign.

SUMMARY

A computer system, according to various embodiments, is adapted for: (1) receiving first traffic source information indicating that a first plurality of user visits to a web site originated from a first traffic source; (2) receiving a first bounce rate percentage associated with the first plurality of user visits to the web site; (3) displaying, on a display medium, an indication of the first traffic source; (4) displaying, on the display medium, an indication of the first bounce rate adjacent the indication of the first traffic source; (5) receiving second traffic source information indicating that a second plurality of user visits to the web site originated from a second traffic source; (6) receiving a second bounce rate percentage associated with the second plurality of user visits to the web site; (7) displaying, on the display medium, an indication of the second traffic source; and (8) displaying, on the display medium, an indication of the second bounce rate adjacent the indication of the second traffic source.

A system, according to particular embodiments, is adapted for: (1) receiving first traffic source information indicating that a first plurality of user visits to a web site originated from a first traffic source; (2) receiving information regarding which of the first plurality of user visits included one or more particular user activities; (3) displaying, on a display medium, an indication of the first traffic source; and (4) displaying, on the display medium, an indication of how many of the first plurality of user visits included one or more particular user activities.

A system, according to certain embodiments, is adapted for: (1) means for receiving media data associated with a display of an advertisement to a user; (2) means for receiving, subsequent to the user viewing the advertisement, web site data associated with a visit of the user to a web site associated with the advertisement; (3) means for using the web site data to determine whether a conversion occurred during the visit of the user to the advertiser web site; and (4) means for displaying an indicator, on a display medium, indicating whether the conversion occurred during the visit of the user to the advertiser web site.

DETAILED DESCRIPTION

The present invention now will be described more fully hereinafter with reference to the accompanying drawings, in which some, but not all implementations are shown. Indeed, these implementations may be embodied in many different forms and should not be construed as limited to the implementations set forth herein; rather, these implementations are provided so that this disclosure will satisfy applicable legal requirements. Like numbers refer to like elements throughout.

Overview

The present disclosure describes, for example, advertising and web site feedback systems and methods that provide feedback via graphical user interfaces. In some implementations, the user interfaces are adapted to display detailed information regarding the usage of a particular web site. In particular, the user interfaces may show, for example: (1) how many users visited the web site during a particular period; (2) the traffic source (e.g., the particular advertisement, advertising medium, type of advertising medium, and/or other traffic source) that lead the user to visit the web site; and (3) whether the user completed a set of desired activities while using the web site (and/or after using the web site). In particular embodiments, the completion of such desired activities is regarded as "a conversion".

The criteria associated with the occurrence of a conversion may be defined, for example, by an advertiser or marketing agency. As a particular example, a conversion may be defined to occur when a user: (1) enters their contact information on a web site; (2) requests additional information for a particular product; (3) purchases a particular product; or (3) takes a combination of several actions, such as entering their contact information on a web site and requesting a brochure for a particular product.

Figure 8:
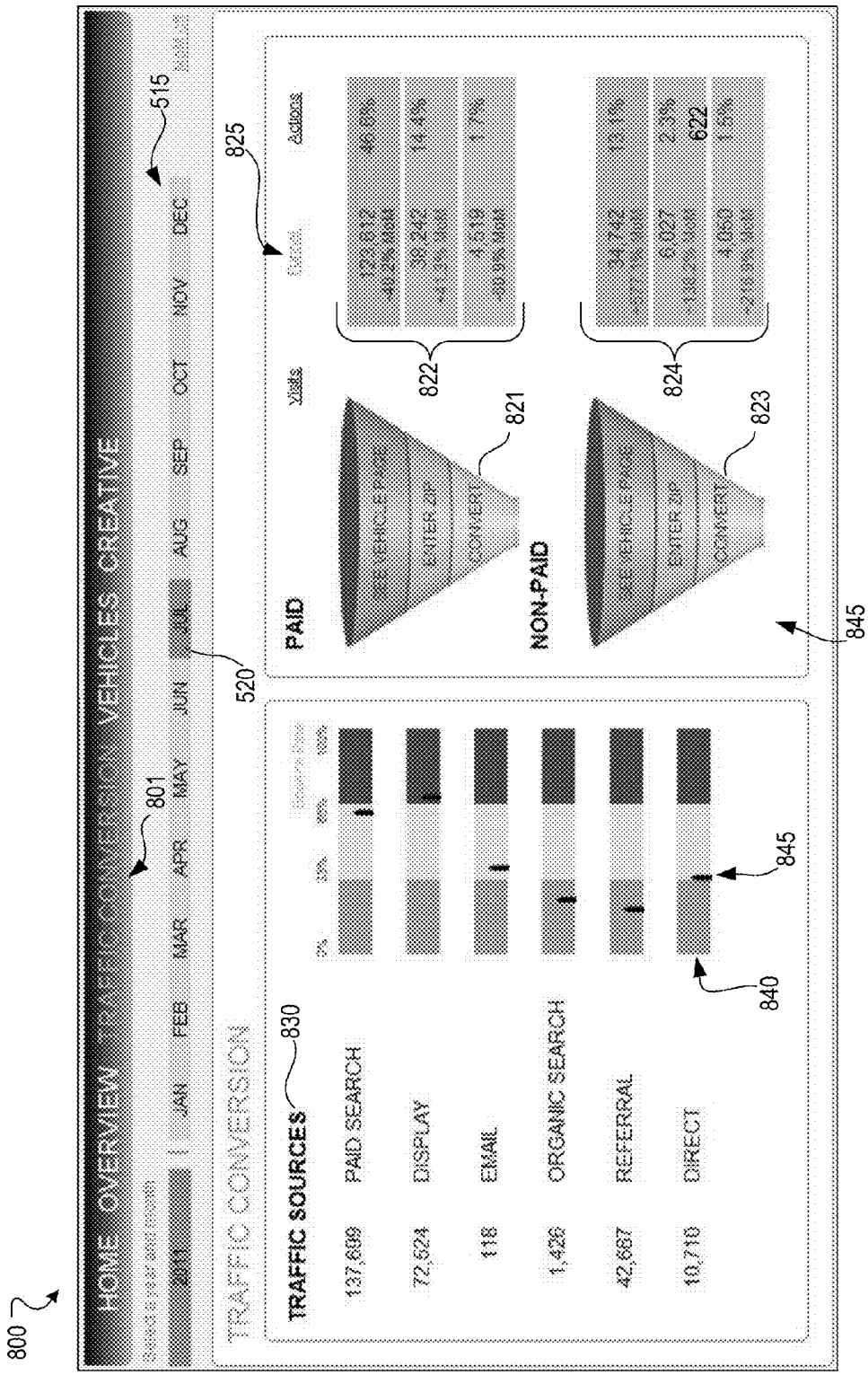
FIG. 8 is an example of a user interface showing a traffic source dashboard that tracks and displays conversion information.

In particular embodiments, the user interface may also display a bounce rate for users visiting the web site. In particular embodiments, a separate bounce rate may be displayed for each different source of traffic to the web site. For example, as shown in FIG. 8, the system may display separate bounce rates for users who visit the web site as a result of: (1) receiving an e-mail advertisement that includes a link to the web site; (2) viewing an advertisement displayed on another web site; (3) viewing a paid search advertisement; (4) viewing the results of an organic search; (5) being referred to the web site by another individual; or (6) simply typing the web site into a browser.

Figure 9:
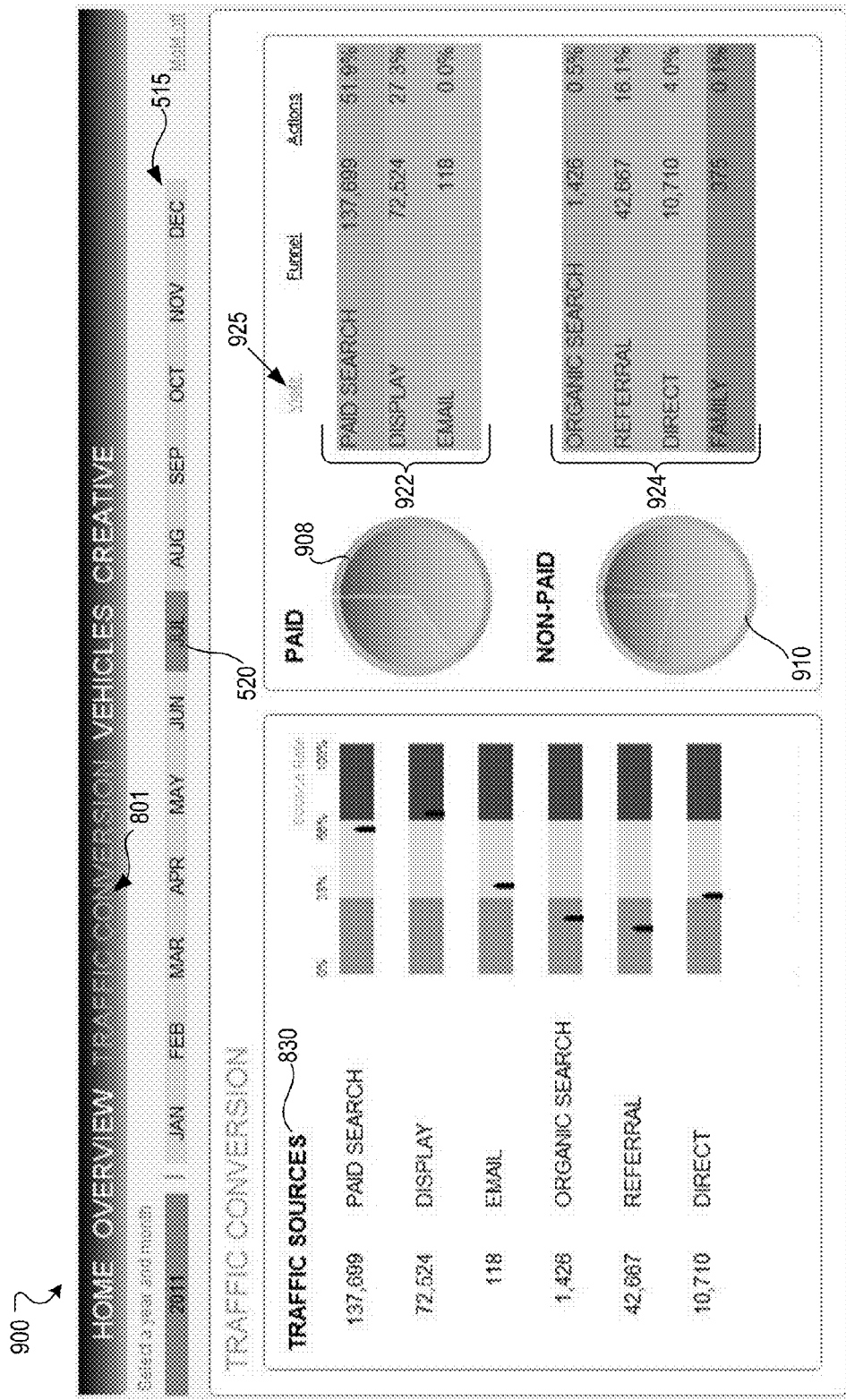
FIG. 9 is an example of a user interface showing a traffic source dashboard that tracks and displays information regarding user web site visits.

As described in various examples, below, a user interface may display this information in any of a variety of suitable ways. In a particular embodiment, the user interface displays the information as a percentage of users who quickly left the web site after visiting the web site (e.g., after being directed to the web site by a particular type of advertisement). As shown in FIG. 9, which is discussed in greater detail below, the user interface may display this information in a color-coded meter format that shows an indication of the bounce rate percentage for a particular traffic source displayed against a background that includes a plurality of color-coded zones. In a particular embodiment: (1) a first of these zones, which corresponds to a desired range of bounce rate percentages, is colored green; (2) a second of these zones, which corresponds to an acceptable, but not desirable, range of bounce rate percentages, is colored yellow; and (3) a third of these zones, which corresponds to an undesirable range of bounce rate percentages, is colored red. This color scheme, which corresponds generally to the colors of a stop light, allows a user to quickly assess the overall performance of certain aspects of a marketing campaign.

System Setup

Figure 1:
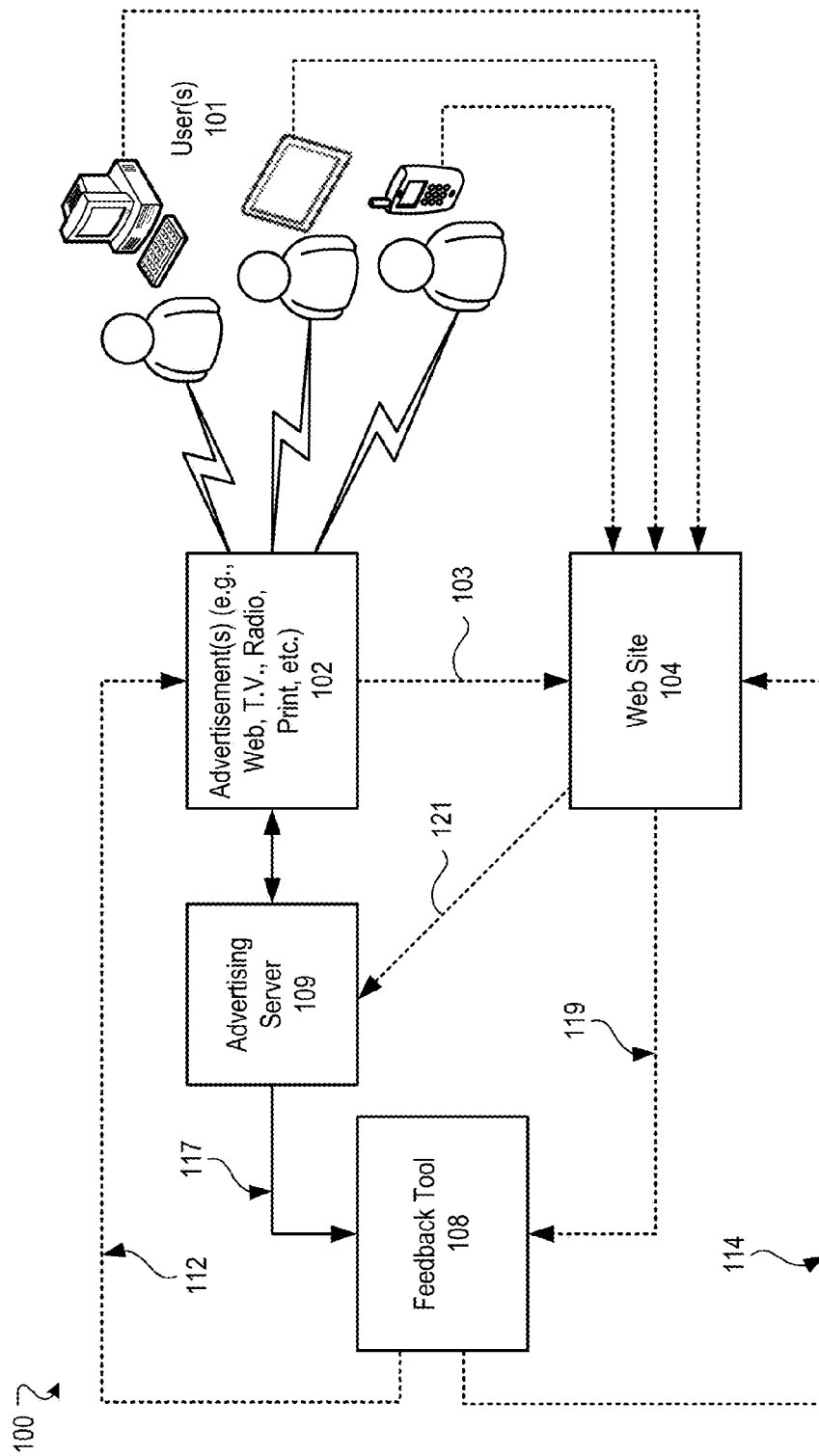
FIG. 1 is a block diagram of an advertising and web site feedback system according to a particular embodiment.

FIG. 1 is a block diagram of an example advertising and web site feedback system 100. According to an implementation, the system is adapted to track data regarding the communication of one or more advertisements 102 for a particular company or product. The advertisement(s) 102 may be, for example, in the form of graphical advertisements (such as banner advertisements), text-only advertisements, image advertisements, audio advertisements, video advertisements, or advertisements combining one of more of any of such components. For example, in some implementations, the advertisement(s) 102 may be displayed to the user(s) 101 as a banner ad on a web page, and/or as a textual and/or graphical display that is initiated in response to, for example, a query on a web site search engine. As another example, advertisements 102 may be displayed to user(s) 101 via television, radio, or print media.

In some implementations, the advertisement(s) 102 may be automatically embedded in one or more web pages (accessible to the user(s) 101 on the Internet) by an advertising server 109. The advertisement(s) 102 may be communicated to the user via one or more networks, such as a local area network (LAN), wide area network (WAN), the Internet, television or radio distribution systems (e.g., a satellite delivery system, hybrid fiber-coax system, etc.) or a combination thereof, that connects the user(s) 101 with providers of the advertisements 102. One or more components, such as web browsers, televisions, radios, or the like, may be used to facilitate viewing of the advertisement(s) 102.

Media data associated with the advertisement(s) 102 may be directly, or indirectly, maintained, and/or tracked by, for example, an advertising server 109. In some implementations, the advertising server 109 may have placed the advertisement(s) 102 on a published medium. For example, a web page that displays the advertisement(s) 102 may include embedded information, such as links, meta-information, and/or machine executable instructions that enables the advertising server 109 to place the advertisement(s) 102 on the web page. In some implementations, the media data is collected in whole or in part by the advertising server 109 from the embedded information.

In some implementations, the media data is tracked and/or collected by other servers in addition to, or in place of, the advertising server 109. For example, other servers associated with the advertisement(s) 102 may track and/or collect media data, such as from servers managing web sites where advertisements are placed. For example, social media site servers and/or other third party servers may also, or alternatively, collect media data although the embodiment shown in FIG. 1 shows only the advertising server 109.

In some implementations, the media data may include data received from embedded information that indicates which advertisement(s) 102 the user(s) 101 viewed and/or selected (including, for example, impressions, click-throughs, etc.), the number of advertisements(s) 102 viewed over a period of time, the time the advertisements(s) 102 were viewed and/or selected, and/or the page location of the advertisements(s) 102. The media data may identify a traffic source associated with the advertisement(s) 102 selected and/or viewed by a user. For example, the traffic source may characterize the advertisement, such as whether the advertisement is an online banner advertisement, paid media or non-paid media, e-mail media, a web site search engine advertisement, an online advertisement on a third party website, an online advertisement on a website of an entity affiliated with the advertiser's web site, or the like.

The media data may also include information about a user through the use of one or more cookies written or updated on a user's computer using the embedded information. For example, the media data may include details about the computer and browser, such as the browser type, the user's rough location (identified by their external IP address), the operating system of the user, and the like. Additionally, media data may include information provided by an advertiser and/or web site administrator, including, for example, the cost of the placed advertisement(s) 102 and the dates on which the costs were incurred.

As an example, a user may, while 'surfing' the Internet, access a web page on a website. When that occurs, a request may be made to a web server (e.g., a web server associated with the website) to display the page, for example, on the user's web browser. Embedded information on the web page may include a code, script, or the like (for example, JavaScript) that is executed. The embedded information may result in the writing or updating of a cookie on the user's browser, and the web page may transmit media data to an advertising server or the like, such as the advertising server 109 shown in FIG. 1. This process may, in various embodiments, be transparent to the user. The cookie may allow new and returning users to a web site to be identified, and use of the embedded information, including cookies, and may permit tracking of the user's 101 action on the web site.

In some implementations, the information collected by the advertising server 109 may include media data. The media data may be transmitted 117 to a feedback tool 108 from the advertising server 109. In some implementations, the media data may be automatically forwarded to the feedback tool 108 from the advertising server 109 according to a predetermined schedule, such as on an hourly or daily basis. In some implementations, the media data may be retrieved by the feedback tool 108 from the advertising server 109 upon request or on a regular basis (e.g., an hourly or daily basis). Additionally, in some implementations, the feedback tool 108 may receive media data directly from an advertiser and/or web site administrator. Such data may include, for example, the spending amount for the placed advertisement(s) 102 and the dates on which the spending occurred.

User(s) of the system 101 may access one or more web sites having one or more web pages, including a particular web site 104 that is associated with advertisement(s) 102 that direct users to the web site 104. In particular embodiments, the web site 104 is considered to be "associated with" the advertisement(s) 102 because the advertisement(s) 102 encourage the user(s) 101 to access the web site 104.

As an example, the advertisement(s) 102 may be for a product or service sold or described on the web site 204. In some implementations, the user(s) 101 may be forwarded 103 to the web site 104 as a result of selecting (e.g., "clicking") on an online advertisement published on a web page. For example, the online advertisement may include a link, banner ad, video, or the like provided on a third party web page that is not affiliated with the web site 104.

Where the advertisement 102 is an online advertisement, it will be appreciated that the selection of an online advertisement by the user(s) 101 resulting in the user's browser being forwarded to the web site 104 may represent a "click-through". The advertising server 109 may provide click-through information in the media data. In some implementations, the advertising server 109 may include a click-through rate for the advertisement(s) 102, where the click-through rate may be, for example, the number of users that clicked on the advertisement (or a link associated with the advertisement) divided by the number of times the advertisement was delivered over a specific time period.

Although the user(s) 101 may access the web site 104 by selecting an online advertisement, in some implementations, the user(s) 101 may access the web site 104 directly. As an example, a user may access the web site 104 by typing the address into a web browser. Direct access may occur with or without the viewing one or more advertisement(s) 102 by the user(s) 101.

As shown in FIG. 1, users may access the web site 104 (directly, e.g., though an online advertisement, or indirectly) to interact with the web site 104. In some implementations, a user's actions on the web site 104 are monitored. The user's actions may be monitored, for example, by a web site administrator (which may include a web server, not illustrated) of the web site using cookies installed on the user's browser and/or embedded information, such as links, meta-information, and/or machine executable instructions. In some implementations, the actions taken by the user(s) 101 on the web site 104 may be stored as web site data that is transmitted 119 to the feedback tool 108. In some implementations, the actions taken by the user(s) 101 on the web site 104 may be transmitted 121 to the advertising server 109 and stored as media data.

In some implementations, the user's actions on the web site 104 that are identified by monitoring may be valued to identify whether the user is interacting with the web site 104 in a way that will result in value to an advertiser or other party. In some implementations, the user's actions are valued to identify whether the user is interacting with the web site 104 in a way that results in a "conversion". As an illustrative example, a user entering contact information on a web site 104 may be deemed to be a more significant action than, for example, merely visiting the web site.

In some implementations, the system may assign a particular value to one or more actions that a user may take on one or more web pages. For example, the viewing of a particular web page of the web site by the user may be assigned a "0" action value. However, the entering of the user's contact information on the web site may be assigned a "5" action value, on a scale of "0" to "5", where a "0" represents an action of relatively low significance and a "5" represents an action of relatively high significance.

A designated goal value may also be stored in the system, which represents a threshold that the sum of the various action values associated with actions performed by the user during a particular visit must reach and/or exceed before a "conversion" is deemed to have occurred. As described in greater detail below with respect to FIGS. 2 and 3, this permits customization as to whether a conversion occurs. Therefore, a conversion may be as simple as the user visiting an advertised web site or purchasing a product on the web site, or it may be a more complex set of activities, such as the user entering their contact information and requesting a brochure for a particular product (e.g., an automobile).

In some implementations, the action values and stored goal value may be included in the web site data. In some implementations, the action values and the stored goal value may be stored on the web pages of the web site 104, on a web server (not illustrated), or separately or with web site data in the feedback tool 108. In some implementations, the media data may be automatically forwarded and/or retrieved by the feedback tool 108, such as on an hourly or daily basis, or according to any other predetermined schedule.

As shown in FIG. 1, in some implementations, the web site data may be transmitted 119 from the web site 104 (or from a web server for serving the one or more web pages of the web site to a user's browser) to the feedback tool 108. In some implementations, the web site data may be transmitted 121 from the web site 104 (or from a web server for serving the one or more web pages of the web site to a user's browser) to the advertising server 109 for transmission to the feedback tool 108.

In particular embodiments, the feedback tool 108 receives media data and web site data, and may generate one or more graphical user interfaces (GUIs) using the media data and web site data. The interfaces, which are explained in greater detail below with reference to various example interfaces, may display information that may be used to determine, for example: (1) which types of advertising are the most effective in generating interest from a particular target group of customers; and (2) which, of a plurality of advertisements, are the most effective.

As described in greater detail below, the user interfaces may include, for example, an aggregated display of media data and web site data. For example, the user interfaces may display information regarding historical web site usage and traffic information, which may enable users of the interfaces to view and identify trends. The interfaces may be viewed by advertisers that generate and/or publish the advertisement(s) 102 and/or by web site administrators that publish the web site 104. The interfaces may enable real-time or near real-time feedback, which may allow advertisers to modify their overall marketing campaign to facilitate increased web site traffic and web site conversions. This may result in a reduced overall advertising spend for the same, or better, overall results.

Example Processes

Figure 2:
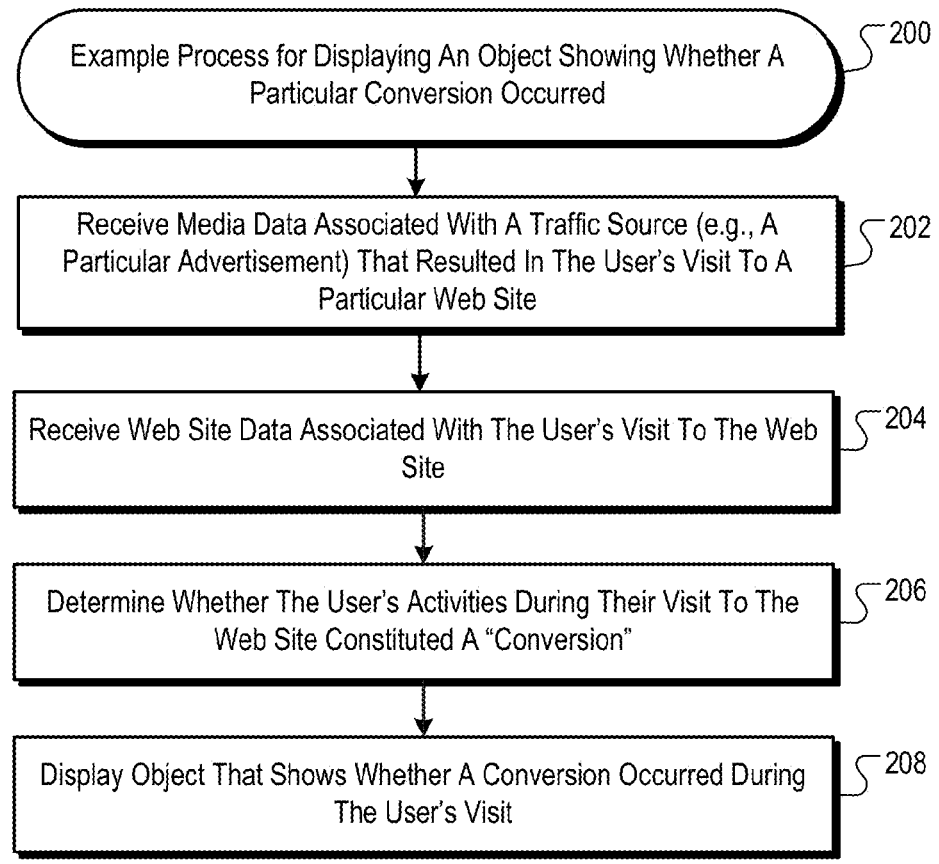
FIG. 2 is a flow diagram of an exemplary process for displaying an object showing whether a particular conversion occurred.

FIG. 2 is a flow diagram of an exemplary process 200 for displaying an object showing whether a conversion has occurred. The process 200 may, for example, be implemented by a computer system such as the system 100 of FIG. 1. Turning to FIG. 2, at Step 202, the system receives media data associated with a traffic source that resulted in a user's visit to a particular web site. As noted above, the advertisement may be any suitable advertisement, such as a television or radio commercial, a direct e-mail advertisement, an advertisement in a magazine or newspaper, a direct paper mail advertisement, an on-line advertisement, or any other suitable advertisement. The media data may be received, for example, at the feedback tool 108 from the advertising server 109, which may collect the media data.

In some implementations, the media data may be received from additional or alternative sources, such as from an advertising agency that is coordinating a marketing campaign for a particular company. In particular embodiments, the media data may include, for example: (1) the general type of traffic source (e.g., type or category of advertisement) that led the user to visit the web site (e.g., TV, radio, print, e-mail, direct mailing, or any other suitable type of advertisement); and (2) the particular advertisement that led the user to visit the web site (e.g., a particular banner advertisement displayed on www.cnn.com).

Returning to FIG. 2, at Step 204, the system receives web site data associated with the user's visit to the web site. In some implementations, for example, the system's feedback tool 108 may receive this information from a web site 104, which collects the web site data responsive to user actions on the web site.

The system then advances to Step 206, where it determines whether a conversion occurred during the user's visit to the web site 104. For example, the web site data may identify one or more actions taken by the user on the web site, where one or more actions (alone or in combination) may be deemed to be a conversion. After the determination occurs, the system proceeds to step 208, where it displays an object that conveys whether the conversion occurred during the user's visit. For example, the system may display a graphical indication of the rate at which a particular radio advertisement (or a series of advertisements run in a particular advertising medium) generated desired activity on a web site. The display of the object may be executed by the feedback tool 108. In some implementations, the object may include a graphic and/or textual representation showing a percentage of conversions that occurred for web site visits generated by one or more different traffic sources. In some implementations, the object may also include a graphic and/or textual representation showing a number of users that were directed to the web site from one or more particular traffic sources during a particular time period.

Figure 3:
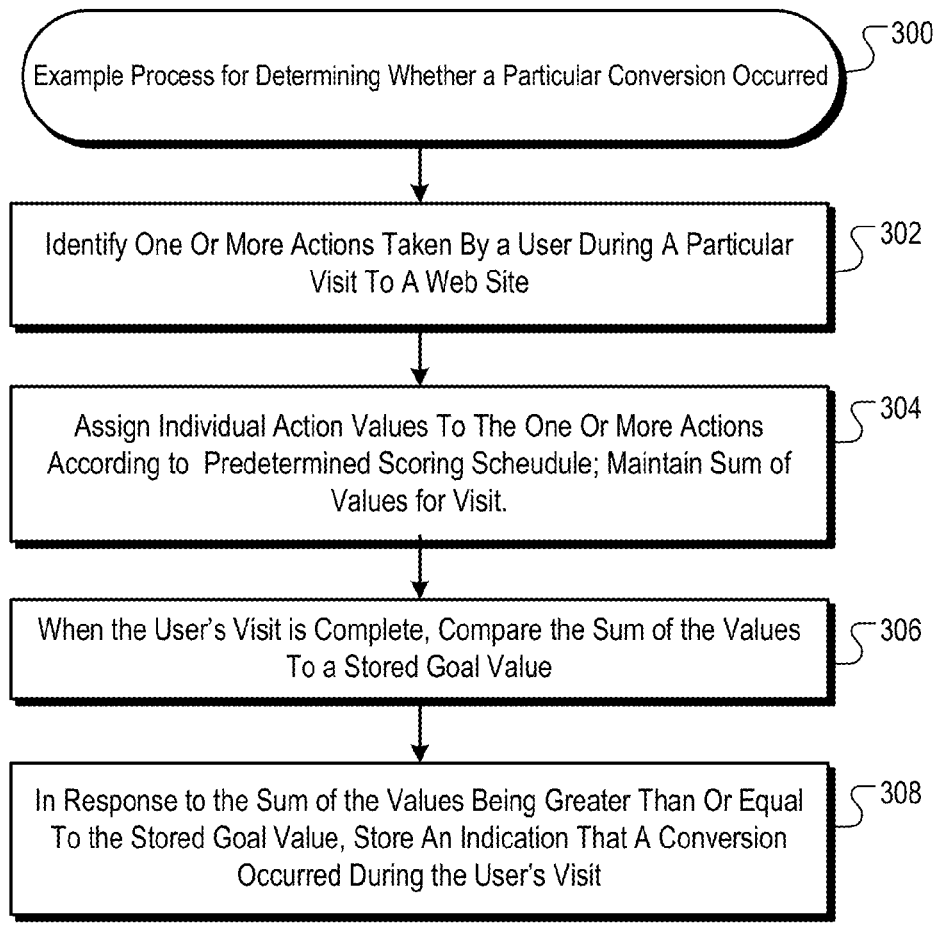
FIG. 3 is a flow diagram of an exemplary process for determining whether a particular conversion occurred.

FIG. 3 is a flow diagram of an example process 300 for determining whether a conversion occurred during a user's visit to a particular web site. As noted above, in various embodiments, this process may involve, for example, comparing summed values associated with one or more actions performed by a user during a particular visit to the web site with a "Goal Value". If the sum of the values associated with the actions is greater than, or equal to, the "Goal Value", the system determines that a conversion occurred during the user's visit to the web site. However, if this sum is less than the "Goal Value", the system determines that a conversion did not occur during the user's visit to the web site. The process 300 may, for example, be implemented in a system such as the system 100 of FIG. 1.

Turning to FIG. 3, at Step 302, the system identifies one or more one or more actions on one or more web pages of a web site that should be deemed to be at least part of a "conversion". At Step 304, the system then assigns an action value to one or more of the identified actions, and maintains an ongoing sum of these action values for the user's particular visit. In some implementations, the one or more action values may be included in the web site data. In some implementations, the one or more action values may be stored on the web pages of the web site 104, on a web server (not illustrated), or in the feedback tool 108.

At Step 306, when the user's visit to the web site 104 is complete, the system compares the sum of action values associated with the user's visit with the stored goal value. The comparison may, for example, be executed by the feedback tool 108 or by the web server and transmitted to the feedback tool 108.

Finally, at Step 308, in response to the sum of the values being greater than or equal to the stored goal value, the system stores, in memory, an indication that a conversion occurred during the user's visit. Similarly, in response to the sum of the values being less than the stored goal value, the system stores, in memory, an indication that a conversion did not occur during the user's visit.

As an illustrative example, one or more actions on one or more web pages may be identified as: "Action 1", "Action 2", "Action 3", "Action 4", and "Action 5". Those respective actions may represent, for example, the user selection of content on a web page, the user input of information on a web page, a purchase by the user on a web page, the download of a brochure, or the like. The actions may be assigned action values based on the significance of the action taken by the user in meeting a goal of the web site administrator or advertiser. The table below provides an example of various actions and corresponding action values.

Example—Actions and Action Values

| Action | Action Value |
| --- | --- |
| Action 1 | 5 |
| Action 2 | 3 |
| Action 3 | 1 |
| Action 4 | 0 |
| Action 5 | 4 |

The stored goal value for this example may be a value of 5. The conversion value for a user's actions is determined by summing the action values for the respective actions the user took during a visit to the web site. For example, if "USER A" took only Action 1, the conversion value corresponding to "USER A" would be 5. If "USER B" took only Actions 2 and 3, the conversion value corresponding to "USER B" would be 4. Those respective conversion values are compared to the stored goal value. Because USER A's conversion value (5) equals or exceeds the stored goal value (5), a conversion occurs. However, because USER B's conversion value (4) fails to equal or exceed the stored goal value (5), a conversion did not occur for that user.

Although, in some implementations, each user action is assigned an action value, it will be appreciated that other events that occur while a user is visiting a web page may be assigned separate event values. Those values may be used by the feedback tool in identifying important events that occur on the web site 104 for the purposes of providing feedback via one or more user interfaces, but, in certain examples, may not be used in the calculation of conversion values.

It should also be understood that the system may use any other suitable technique for determining whether a conversion has occurred during a user's visit. For example, if an advertiser's primary goal is to sell a particular item, then the advertiser may specify that a conversion may only occur for a particular user when the user purchases the particular item.

Figure 4:
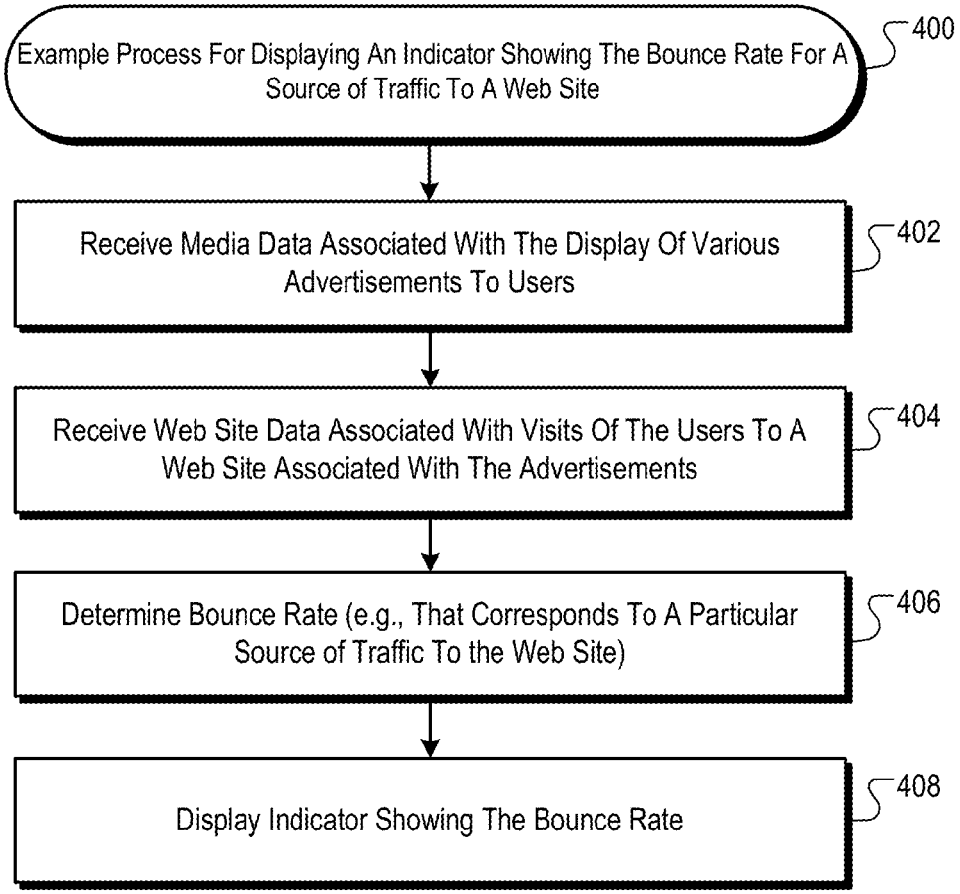
FIG. 4 is a flow diagram of an exemplary process for displaying an indicator showing the bounce rate for a traffic source.

FIG. 4 is a flow diagram of an example process 400 for displaying an indicator showing the bounce rate for a particular source of traffic to a web site. The process 400 may, for example, be implemented in a system such as the system 100 of FIG. 1. Beginning at Step 402, the system receives media data associated with the display of various advertisements to users. The media data may be received, for example, at the feedback tool 108 from the advertising server 109, which may collect the media data. In some implementations, the media data may be received from additional or alternative sources. For example, the media data may identify a particular advertisement selected by users that lead the user to visit the web site. In some implementations, the media data may indicate a traffic source type associated with one or more advertisements. For example, the media data may indicate whether the advertisement was displayed to the user as a paid-search advertisement, an e-mail advertisement, or a banner advertisement, or other type of advertisement. In various embodiments, for user visits that did not result from a particular advertisement, the media data may include information regarding the applicable source of traffic to the web site (e.g., direct referrals or direct entry of the web site address into the system by the user).

Next, at Step 404, the system receives web site data associated with the visits of users to a particular web site associated with the viewed advertisements. In some implementations, the web site data may be received at the feedback tool 108 from the web site 104, which collects the web site data responsive to user actions on the web site. In some implementations, the web site data may be received at the feedback tool 108 from the advertising server 109, which collects the web site data responsive to user actions on the web site.

Next, at Step 406, the system determines a bounce rate, based, for example, on information obtained in Steps 402 and 404. In some implementations, the bounce rate is determined for users sharing a common traffic source associated with the advertisement. The bounce rate may represent the percentage of users that, via a particular traffic source, access the web site 104 at a web page and then leave the site rather than viewing other web pages on the site. In other implementations, the bounce rate may represent the percentage of users that, via a particular traffic source, enter the web site 104 and then leave before a conversion occurs, as described above with respect to FIGS. 2 and 3.

The bounce rate may be determined, for example, by the feedback tool 108. In some implementations the bounce rate may be determined by the advertising server 109 and transmitted to the feedback tool 108.

Finally, after determining the bounce rate at Step 406, the system proceeds to Step 408, where it displays an indicator showing the determined bounce rate. In various embodiments, the display of the indicator may be executed by the feedback tool 108. In some implementations, the indicator may include a graphic and/or textual representation, such as a bar representing a range of bounce rates, with a line, arrow, or other indicia representing a specific bounce rate. The bar may include two or more colors, where the two or more colors represent a subset of bounce rates within the range of bounce rates.

Example User Interfaces

FIGS. 5-10 illustrate example user interfaces according to various embodiments. Such user interfaces may, for example, be provided to an advertiser and/or web site administrator to allow the advertiser and/or web site administrator to view statistics associated with the effectiveness of advertisements and the web site in generating useful activity on a web site, such as conversions. According to a particular implementation, the interfaces may be generated by a User Interface engine of the feedback tool 108 based on information collected by the feedback tool 108 from the advertising server 109, web site 104, web site administrators, advertisers using the feedback tool, web servers, or other suitable sources of information.

Figure 5:
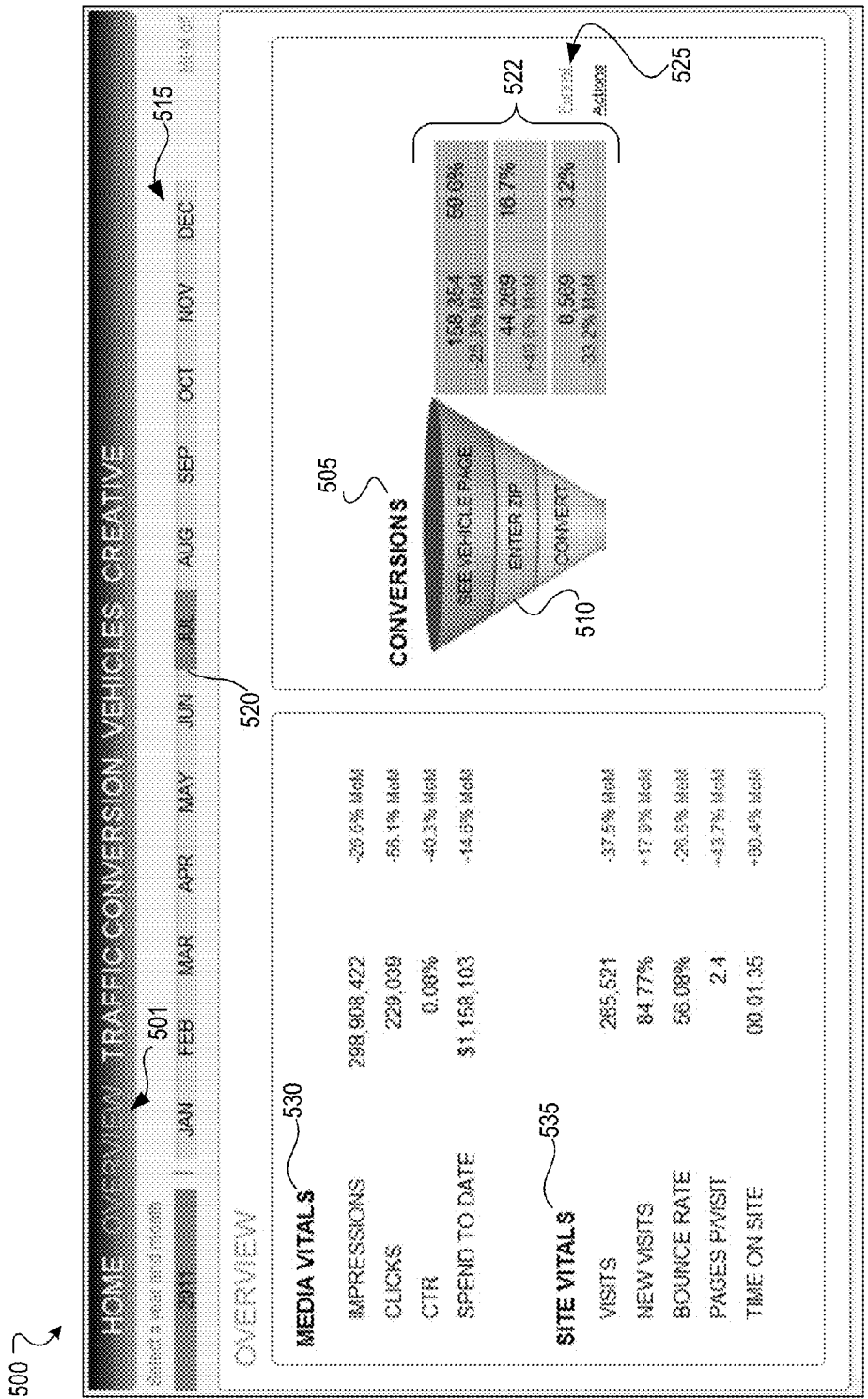
FIG. 5 is an example of a user interface showing an overview dashboard.

FIG. 5 illustrates an example of a user interface showing an overview dashboard 500, according to a particular implementation. The overview dashboard 500 may be accessed by a user, for example, by the user selecting an "overview" menu option 501. In the example of FIG. 5, the interface communicates that the user has selected the overview dashboard by changing the color of the "overview" menu option 501. The interface may also include a date selection 515, which permits a user to select one or more time periods and/or dates for which the user wishes to view performance statistics associated with the effectiveness of particular types of advertisement(s) 102 and the web site 104. For example, in the interface of FIG. 5, the user may select one or more months, such as "July" 520. In response to the user selecting July from a list of months, the dashboard 500 illustrates statistics associated with web site visits made during the month of July. Although not illustrated, other time period and/or dates may be selected, such as weeks, particular days of the week within a time period, times of the day within a time period, and the like.

In various embodiments, the overview dashboard 500 may include information corresponding to conversions 505, media vitals 530, and site vitals 535. As shown, the conversions 505 may include an object (including, for example, a graphical and/or textual object) illustrating how many of one or more particular activities on a web site (e.g., conversions) occurred during the selected time period and/or date. In some implementations, the overview dashboard 500 shows a total number of particular activities that occurred across all traffic sources during the selected time period. In some implementations, the overview dashboard 500 shows a percentage of conversions occurring across all traffic sources during the selected time period. The object may include a funnel 510 and corresponding data 522 and may be displayed when a user selects a "funnel" selection 525 on the overview dashboard 500.

The funnel 510 may show one or more significant actions that may be taken by users during their visit to the web site 104. The selection of the significant actions may be made, for example, by a user of the interface from a list of actions for which site data has been collected, where the actions are tiered within the funnel displayed on the dashboard 500. For example, in the example dashboard 500, an advertiser for an automobile manufacturer or a web site administrator for the automobile manufacturer may wish to know how many and what percentage of user(s) 101 took a first action, "See Vehicle Page", by viewing a particular vehicle page on the web site 104 during the month of July. In the example dashboard 500, the advertiser for an automobile manufacturer or the web site administrator for the automobile manufacturer may also wish to know how many and what percentage of user(s) 101 also took a second action, "Enter Zip", by entering their zip code into the web site 104 during the month of July. The funnel 510 may also include a "convert" action corresponding to whether the user(s) 101 interacted with the web site 104 to result in a conversion, as described above with respect to FIGS. 2 and 3. In this example, a conversion is deemed to occur when the user requests a brochure of a particular vehicle after viewing the vehicle's web page and entering their postal code.

The corresponding data 522 includes the number of users that took each action shown in the funnel 510, along with a percentage number showing what percentage of users visiting the web site 104 took the respective actions during the selected time period and/or date, such as during the month of July. In some implementations, the corresponding data 522 may also illustrate an increase or decrease in the actions over a previous time period. For example, the corresponding data 522 shown in FIG. 5 illustrates a Month-over-Month ("MoM") increase or decrease in the "See Vehicle Page", "Enter Zip", and "Convert" actions. The data shown in the corresponding data 522 may be retrieved and/or based on web site data, and may be calculated, for example, by the feedback tool 108.

Web site data information displayed through the conversions 505 may be illustrated adjacent to a media vitals display 530. The media vitals display 530 may, for example, display information corresponding to media data associated with the selected time period and/or date. For example, in the overview dashboard 500 of FIG. 5, the media vitals display 530 may include the number of advertising impressions, clicks, click-throughs, and spending revenue paid for advertisement(s) 102 used to generate traffic to the web site. In some implementations, the media vitals display 530 may further illustrate an increase or decrease over a previous time period. For example, the media vitals display 530 shown in FIG. 5 illustrates a month-over-month ("MoM") increase or decrease over a previous month.

Other web site information may also be displayed adjacent to the media vitals display 535. For example, a site vitals display 535 may display information, associated with the selected time period and/or date, regarding usage of the web site 104. For example, on the overview dashboard 500 of FIG. 5, the site vitals display 530 may include, for the selected time period: (1) the number of visits to the web site 104; (2) the number of new users visiting the web site 104; (3) the bounce rate of visitors to the web site 104; (4) the number of web pages viewed, on average, by users on each visit to the web site 104; and (5) and average time that users spend on the web site 104. In some implementations, the site vitals display 535 may illustrate an increase or decrease over a previous time period. For example, the site vitals display 535 shown in FIG. 5 illustrates a month-over-month ("MoM") increase or decrease over a previous month.

It will be appreciated that the aggregated display of advertisement and web site statistics that illustrate performance of the advertisement(s) 102 and the web site 104 on a single interface may, in various embodiments, provide advertisers and administrators of the web site 104 with substantive feedback in real-time or near real-time. For example, the interfaces may show how media, such as advertising, affects behavior of users accessing a web site, how users behave on the web site, and which traffic sources result in the highest quality visits to the web site. This may, for example, permit advertisers and web site administrators to make necessary modifications to advertisements and/or the web site to produce increased web site traffic and web site conversions.

Figure 6:
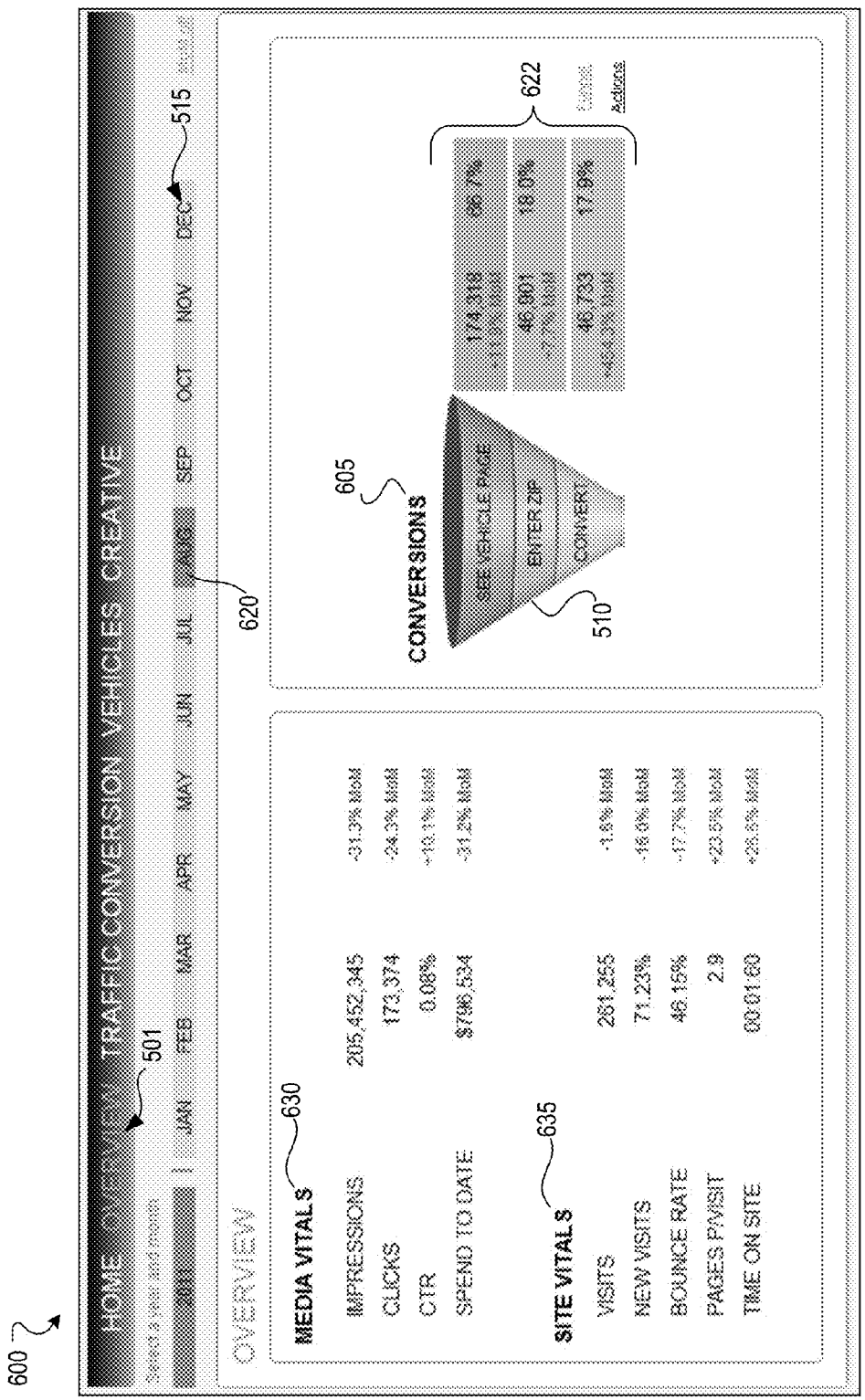
FIG. 6 is another example of a user interface showing an overview dashboard.

FIG. 6 illustrates another example of a user interface showing an overview dashboard 600. The overview dashboard 600 is similar to the FIG. 5 dashboard 500, but shows conversions 605, media vitals 630, and site vitals 635 corresponding to a different selected time period (in this case, August). As a result, the corresponding data 622 included in the graphical object show data for the respective actions during August. It will be appreciated that the corresponding data 522, 622 shown in FIGS. 5 and 6, respectively, allow a user of the interface to quickly view web site usage information and media vitals 630 and site vitals 635 for various periods of time to identify advertising and web site usage trends.

Figure 7:
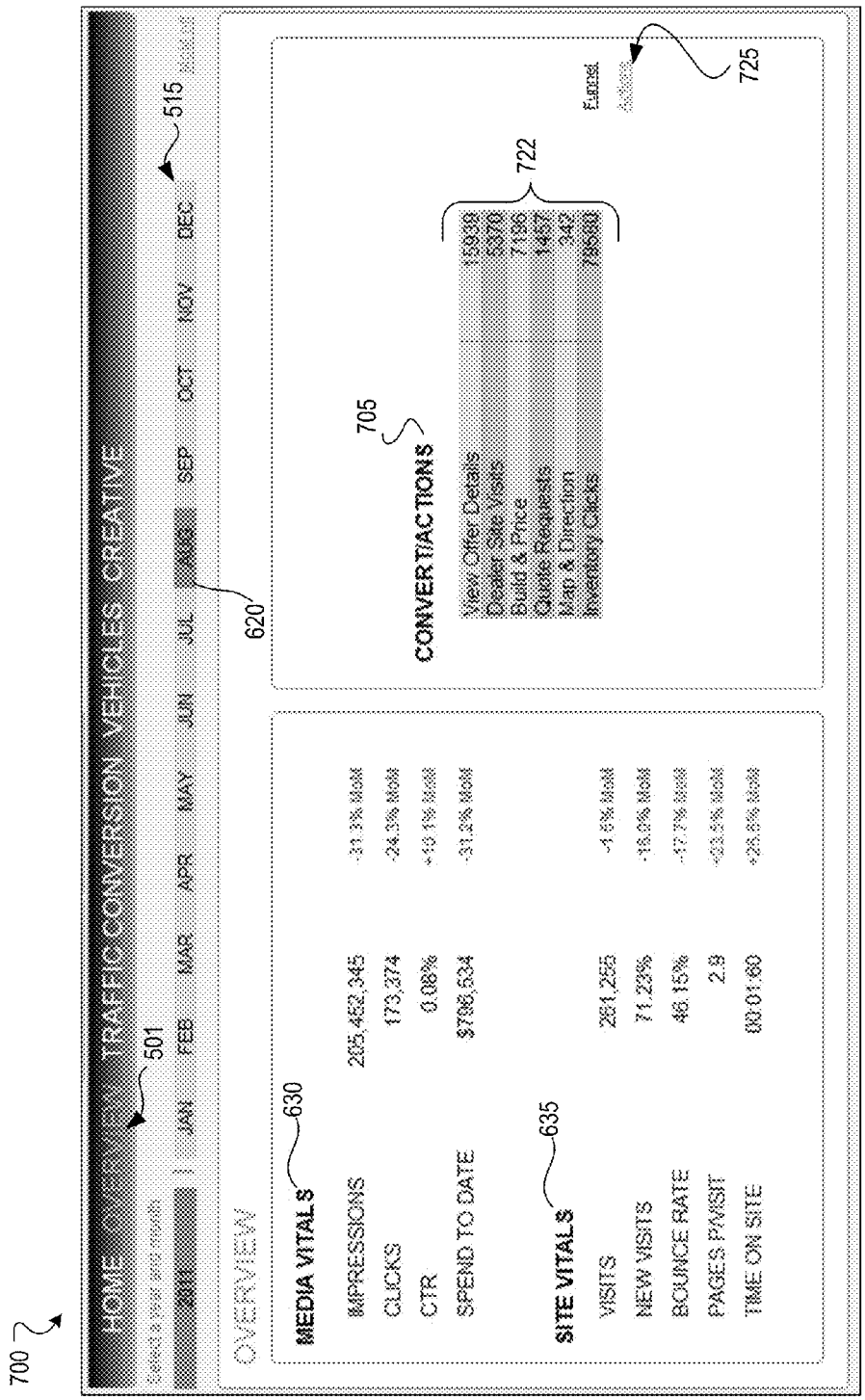
FIG. 7 is an example of a user interface showing an overview dashboard that tracks and displays web site user actions.

FIG. 7 illustrates an example of a user interface showing an overview dashboard including web site user actions 700. The overview dashboard 700 may be accessed by a user, for example, by selection of an "overview" selection 501, such as by a user clicking a mouse on the "overview" selection 501. The overview dashboard including web site user actions 700 is similar to the dashboards shown in FIGS. 5 and 6, except that the graphical object showing a funnel 510 and corresponding data 522 has been replaced by a graphical object showing user actions 722. Like the dashboards 500, 600 shown in FIGS. 5 and 6, the dashboard 700 displays data corresponding to the selected time period and/or date. The graphical object including user actions 722 can be displayed, for example, when a user selects an "action" selection 725 on the dashboard 700 (or on other overview dashboards 500, 600.)

In various embodiments, the user actions display 722 shows the number of one or more significant actions that may be taken by users during their visit to the web site 104. The selection of the significant actions may be made, for example, by a user of the interface from a list of actions for which site data has been collected. For example, as shown in the example dashboard 700 of FIG. 7, an advertiser for an automobile manufacturer or a web site administrator for the automobile manufacturer may wish to know how many user(s) 101 took the actions of: (1) viewing offer details; (2) visiting a particular dealer web site; (3) building and processing a vehicle; (4) requesting a quote; (5) viewing a map and directions (for example, to a dealer); and (6) viewing inventory on the web site. The numbers shown by the user actions display 722 show the number of users that performed each of the actions, which may be determined from the web site data. The feedback tool 108 may, in some implementations, calculate this data.

FIG. 8 illustrates an example of a user interface showing a traffic source dashboard 800 displaying information regarding conversions. Unlike the overview dashboards 500, 600, 700 described above, which may show media data and web site data across all traffic sources during a particular time period and/or date, the traffic source dashboard 800 shown in FIG. 8 may include representations of media data and web site data that is categorized by traffic source. For example, the dashboard 800 may illustrate data such as bounce rates, conversions, and the like, for users 101 accessing the web site 104 via particular traffic sources.

As shown in FIG. 8, a traffic source display 830 containing this data may identify a traffic source associated with the user's visit to the web site. For example, this display may indicate whether each user visited the site as a result of: (1) an advertisement displayed during a paid search; (2) an advertisement displayed on a particular web site; (3) an e-mail advertisement; (4) an organic web-based search performed by the user; (5) a referral; or (6) direct input of web site information into the user's browser.

As shown in FIG. 8, the traffic source dashboard 800 may be accessed by selecting a "traffic conversion" selection 801. The interface shows that the user has selected the overview dashboard by highlighting the "traffic conversion" selection 801, for example, by changing its color. As with the illustrative interfaces described above, the interface may include a date selection 515, which permits a user to select one or more time periods and/or dates for which the user wishes to view performance statistics associated with the effectiveness of advertisement(s) 102 and web site 104. As with the illustrative interface shown in FIG. 5, in the interface shown in FIG. 8, the user may select one or more months, such as a "July" selection 520. Thus, the dashboard 800 illustrates statistics associated with advertisements placed, and web site visits, during the month of July. Although not illustrated, other time period and/or dates may be selected, such as weeks, particular days of the week within a time period, times of the day within a time period, and the like.

The traffic source dashboard 800 may include information corresponding to conversions on the web site 104, and the bounce rates for different traffic sources 830 during the selected time period. The dashboard 800 may also include information corresponding to user actions taken on the web site 104. This information may be broken down by traffic source (e.g., a first display may show this information for paid traffic sources, and a second display may show this information for unpaid traffic sources).

As shown in FIG. 8, a conversions display 845 may include an object (including, for example, a graphical and/or textual object). In some implementations, the object of the conversions display 845 may show a total number of conversions occurring for a particular traffic source during the selected time period and/or date. In some implementations, the object of the conversions display 845 shows a percentage of conversions occurring for a particular traffic source during the selected time period and/or date. The object of the conversions display 845 may also or alternatively show one or more significant actions that may be taken by users during their visit to the web site 104 from a particular traffic source.

As illustrated, the object may include one or more funnels (such as those described with respect to FIG. 5) and corresponding data 822, 824 for each of the traffic sources when a user selects a "funnel" selection 825 on the dashboard 800. The one or more funnels 821, 823 may show one or more significant actions that may be taken by users during their visit to the web site 104. The selection of the significant actions may be made, for example, by a user of the interface from a list of actions for which site data has been collected, where the actions are ranked within the funnel displayed on the dashboard 800. For example, in the example dashboard 800, an advertiser for an automobile manufacturer or a web site administrator for the automobile manufacturer may wish to know how many and what percentage of user(s) 101 accessing the web site 104 after viewing a paid advertisement took a first action, "See Vehicle Page", by viewing a particular vehicle page on the web site 104 during the month of July. In the example dashboard 800, the advertiser for an automobile manufacturer or the web site administrator for the automobile manufacturer may also wish to know how many and what percentage of user(s) 101 accessing the web site's vehicle page after viewing a paid advertisement took a second action, "Enter Zip", by entering their zip code on the vehicle page during the month of July. The funnel 510 may also include a "convert" action corresponding to whether the user(s) 101 accessing the web site 104 after viewing a paid advertisement interacted with the web site 104 in a way that could be considered to be a "conversion", as described above with respect to FIGS. 2 and 3. In a particular, a conversion may be deemed to have occurred after the user visited the vehicle page, entered their zip code on the vehicle page, and requested a brochure for the vehicle. Similar actions corresponding to other traffic sources (e.g., non-paid advertisements) may also be displayed.

The corresponding data 822, 824 may include the number of users that took each action shown in the funnel for respective traffic sources, and may include a percentage number showing what percentage of users visiting the web site 104 took the respective actions during the selected time period and/or date, such as the month of July. In some implementations, the corresponding data 822, 824 may also illustrate an increase of decrease in the actions over a previous time period. For example, the corresponding data 822, 824 shown in FIG. 8 illustrates a Month over Month ("MoM") increase or decrease in the "See Vehicle Page", "Enter Zip", and "Convert" actions. The data shown in the corresponding data 822, 824 may be determined from the web site data and/or media data, and may be calculated, for example, by the feedback tool 108.

The traffic source dashboard 800 may also include bounce rate information corresponding to one or more traffic sources 830. The selection of the displayed traffic sources 830 may be made, for example, by a user of the interface from a list of traffic sources for which media data and web site data has been collected. In some implementations, the number of users accessing the web site 104 from each traffic source may be displayed. For example, in the example dashboard 800 shown of FIG. 8, there are 118 users that accessed the web site as a result of email advertising. This interface permits an advertiser and/or administrator of the web site 104 to quickly identify where the web site's traffic originates from. In addition to identifying where web site traffic originates from, data associated with a user's interaction on the web site 104 may also be displayed. This aggregation of information provides feedback on both the effectiveness of advertisements in driving traffic to a web site, and the actions of users in interacting with the web site, where those users accessed the site from particular traffic sources.

According to some implementations, a bounce rate may be displayed for each of the traffic sources 830 using an indicator 845. In various embodiments, the bounce rate may be determined by the feedback tool 108. Also, in certain embodiments, the bounce rate may be determined by the advertising server 109 and transmitted to the feedback tool 108. As noted above, the bounce rate may represent the percentage of users that enter the web site 104 at a web page from a traffic source and then leave the site rather than viewing other web pages in the site. In other implementations, the bounce rate may represent the percentage of users that enter the web site 104 from a traffic source and then leave before a conversion occurs, as described above with respect to FIGS. 2 and 3.

The display of the indicator 845 may be executed by the feedback tool 108. In some implementations the indicator may include a graphic and/or textual representation, such as a bar 840 representing a range of bounce rates, with a line, arrow, or other indicia 845 representing a specific bounce rate. The bar may include two or more colors, where the two or more colors represent a subset of bounce rates within the range of bounce rates. For example, the interface 800 shown in FIG. 8 displays bounce rates using a color-coded bar, where a green portion of the bar 840 represents a range of relatively low bounce rates (e.g., 1-33%), a yellow portion of the bar 840 represents range of intermediate bounce rates (e.g., 33-66%), and a red portion of the bar 840 represents a range of relatively high bounce rates (e.g., 66-100%). It will be appreciated, in light of this disclosure, that other ranges may be used. Also, in particular embodiments, the ranges may be specific to a particular traffic source. In particular embodiments, the use of a color-coded bar 840 and indicia 845 to illustrate the bounce rate allow a user of the interface 800 to quickly view which traffic sources 830 are particularly effective—or ineffective—at driving desired traffic to the web site.

As may be understood from FIG. 8, the traffic sources display may include the overall number of web site visits made to the web site from each particular traffic source. In FIG. 8, this number is displayed to the left of the description of the traffic source.

FIG. 9 illustrates an example of a user interface showing a traffic source dashboard 900 including web site visits. The traffic source dashboard 900 is similar to the dashboard 800 shown in FIG. 8, but includes an object illustrating the number of users accessing the web site 104 from the various traffic sources 830 for a selected time period and/or date, rather than the funnel object described above. In the example shown in FIG. 9, the date is broken down into "paid" and "unpaid" categories, and is further broken down by the type of traffic source within each category.

Figure 10:
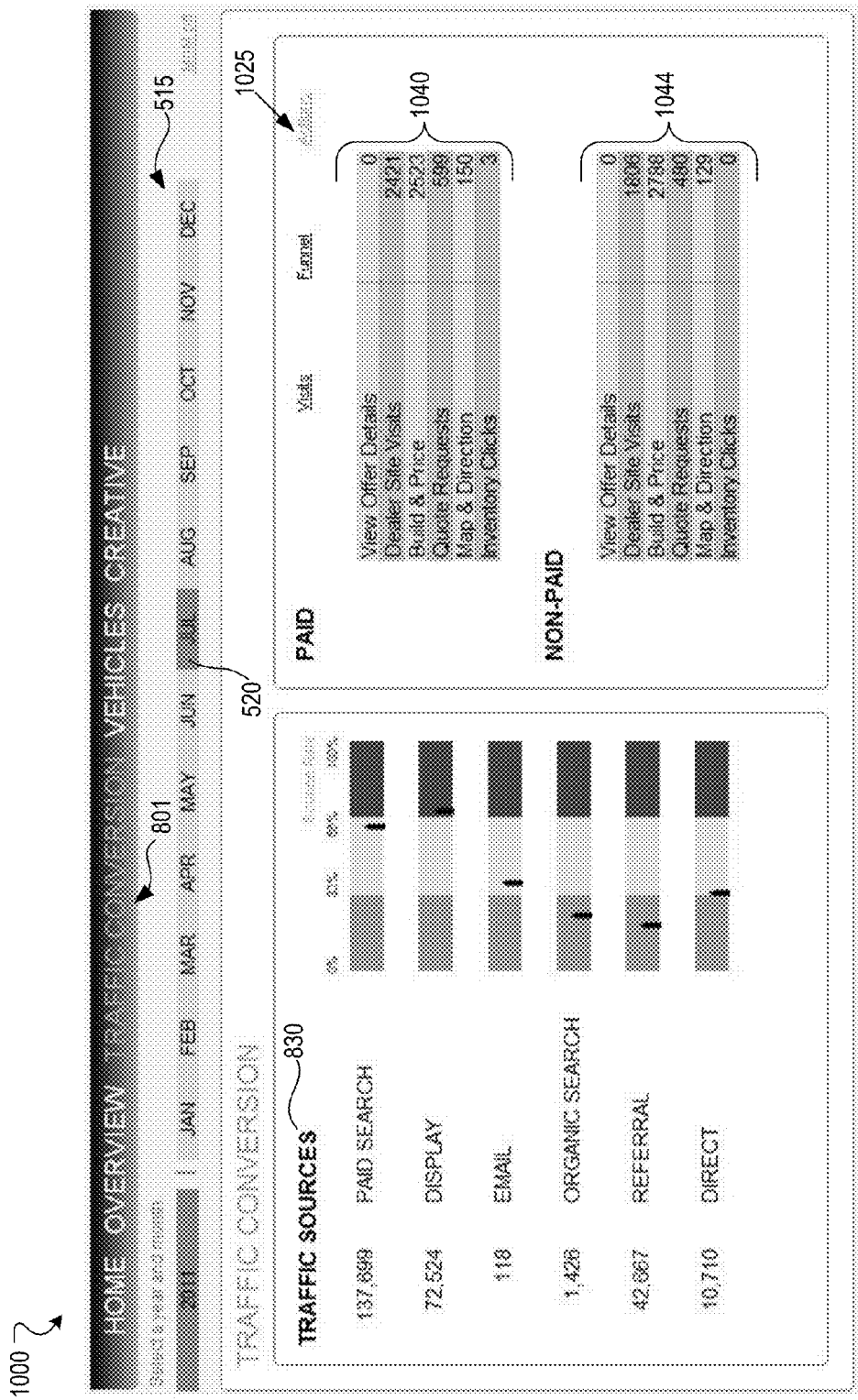
FIG. 10 is an example of a user interface showing a traffic source dashboard that tracks and displays information regarding various web site user actions.

FIG. 10 illustrates an example of a user interface showing a traffic source dashboard 1000 including that lists web site user actions. The traffic source dashboard 1000 is similar to the dashboard 800 shown in FIG. 8, but includes an object illustrating significant actions taken by users after accessing the web site 104 from the various traffic sources 830 for a selected time period and/or date instead of the funnel structure described above in reference to FIG. 8.

When a user selects an "action" selection 1025 on the dashboard 1000 (or on other traffic source dashboards 800, 900), the object may include one or more user action displays 1040, 1044. The user action displays 1040, 1044 show the number of one or more significant actions that may be taken by users during their visit to the web site 104, where the actions correspond to user actions after accessing the web site 104 from one or more traffic sources, or types of traffic sources.

The selection of the significant actions may be made, for example, by a user of the interface from a list of actions for which site data has been collected. For example, in the example dashboard 1000, an advertiser for an automobile manufacturer or a web site administrator for the automobile manufacturer may wish to know how many user(s) 101 took actions after accessing the web site 104 from paid or non-paid traffic sources, where the actions include: viewing offer details, visiting a dealer web site associated with the web site 104, building and processing a vehicle, requesting a quote, viewing a map and directions (for example, to a dealership), and viewing inventory on the web site. The numbers shown by the user actions 1040, 1044 show the number of users that performed each of the actions, and may be determined from the web site data. The feedback tool 108 may, in some implementations, calculate this information.

It should be understood, based on this disclosure, that media data and web site data may be used to generate interfaces, including the dashboards described above with respect to FIGS. 5-10, to enable real-time or near-real time feedback, which permits advertisers and web site administrators to make necessary modifications to advertisements and/or the web site to result in increased web site traffic and web site conversions. As described above, the media data and web site data may be used to generate one or more objects and/or indicators (including graphical and/or textual objects and/or indicators) showing performance statistics associated with the effectiveness of advertisement(s) 102 and the web site 104, either collectively, such as for all advertisements and/or traffic sources, or for individual advertisements and/or traffic sources.

In some implementations, the media data and web site data may also generate interfaces showing statistics associated with one or more web pages and/or web page content items. For example, interfaces may display information such as the number of users that viewed a particular web page and/or web page content item for a particular time period. In some implementations, interfaces may display information such as the number of users that viewed a particular web page and/or web page content item for a particular time period, where the user accessed the web site 104 from one or more traffic sources. Still other interfaces may be generated that aggregate the objects, indicators, and content described herein to permit a consolidated feedback view.

System Architecture

Figure 11:
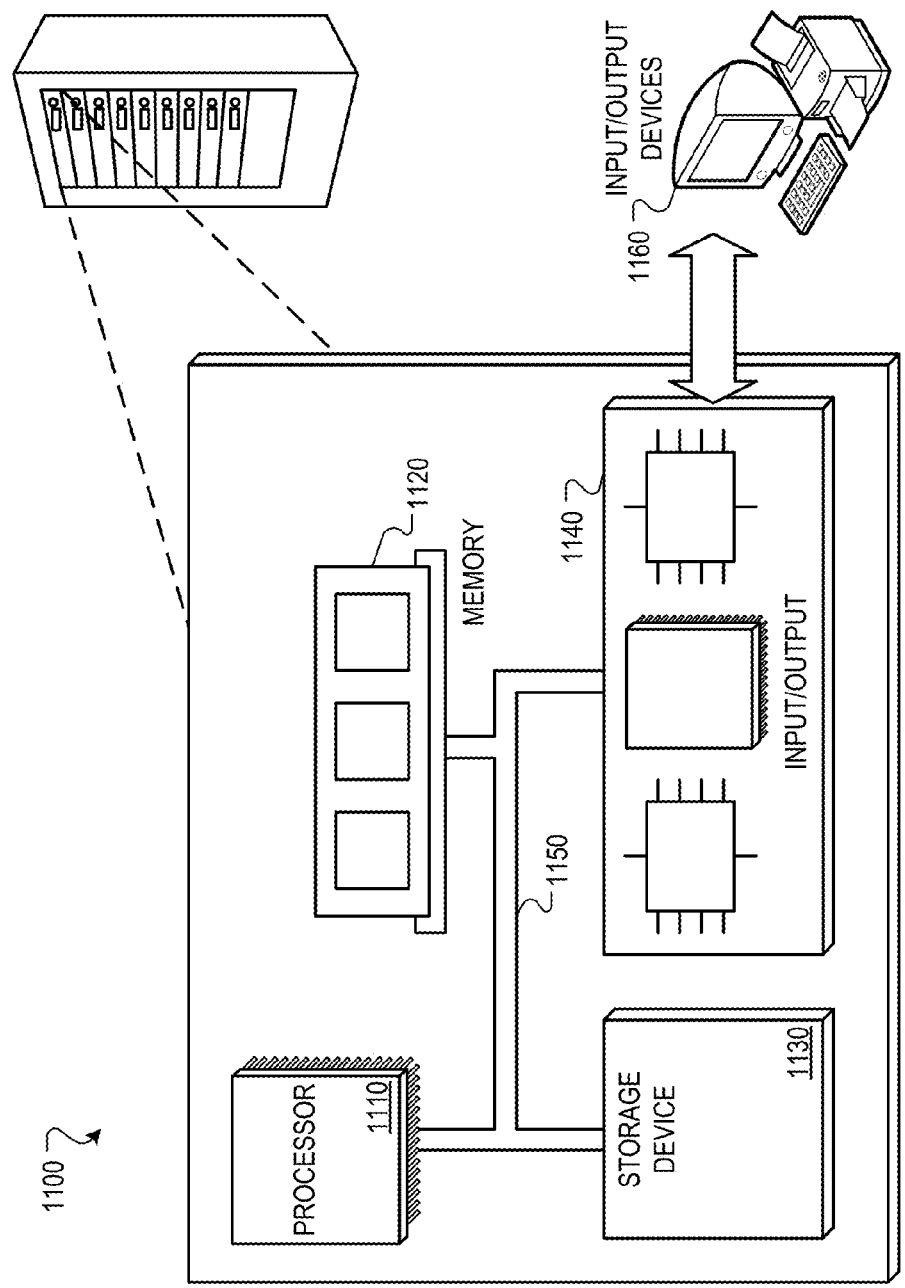
FIG. 11 is a schematic diagram of an example computer system.

FIG. 11 is a schematic diagram of an example computer system 1100 that may be utilized to implement the systems and methods described herein. The example computer system 1100 may represent the feedback tool and/or one or more other components in the example advertising and web site feedback system 100 of FIG. 1. The system 1100 includes a processor 1110, a memory 1120, a storage device 1130, and an input/output device 1140. Each of the components 1110, 1120, 1130, and 1140 may, for example, be interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130.

The memory 1120 stores information within the system 1100. In one implementation, the memory 1120 is a computer-readable medium. In one implementation, the memory 1120 is a volatile memory unit. In another implementation, the memory 1120 is a non-volatile memory unit. The storage device 1130 is capable of providing mass storage for the system 1100. In one implementation, the storage device 1130 is a computer-readable medium. In various different implementations, the storage device 1130 may, for example, include a hard disk device, an optical disk device, or some other large capacity storage device.

The input/output device 1140 provides input/output operations for the system 1100. In one implementation, the input/output device 1140 may include one or more of a network interface devices, e.g., an Ethernet card, a serial communication device, e.g., and RS-232 port, and/or a wireless interface device, e.g., and 802.11 card. In another implementation, the input/output device may include driver devices configured to receive input data and send output data to other input/output devices, e.g., keyboard, printer and display devices 1160. Other implementations, however, may also be used, such as mobile computing devices, mobile communication devices, set-top box television client devices, etc.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Conclusion

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

I claim:

1. A non-transitory computer-readable medium storing computer executable instructions for:
   receiving first traffic source information indicating that a first plurality of user visits to a web site originated from a first traffic source, wherein said first traffic source is selected from the group consisting of:
      i) a television advertisement;
      ii) a radio advertisement; and
      iii) non-electronic media;
   receiving information regarding which of said first plurality of user visits included one or more particular user activities;
   receiving a goal value, wherein said goal value comprises at least one numerical value;
   storing said goal value in memory;
   determining whether a conversion resulted from a particular visit of said first plurality of user visits by:
      using a numerical value associated with each of said one or more particular user activities to determine a conversion value, wherein using said numerical value associated with each of said one or more particular user activities to determine said conversion value comprises summing said numerical value of each of said one or more particular user activities; and
      comparing said conversion value with said stored goal value to determine whether a particular conversion occurred during said particular visit; and
   transmitting, for display on a display medium:
      an indication of said first traffic source;
      an indication of which of said first plurality of user visits included said one or more particular user activities;
      an indicator showing which of said first plurality of user visits resulted in said conversion; and
      an indication of a bounce rate adjacent said indication of said first traffic source, wherein said
      bounce rate is based at least partially on:
         the number of said first plurality of user visits that did not result in said conversion; and
         the total number of said first plurality of user visits.

2. The non-transitory computer-readable medium of claim 1, wherein said step of displaying said indication of said bounce rate comprises:
   displaying a first bar comprising at least a first zone and a second zone, said first zone corresponding to a relatively high range of bounce rates, and said second zone corresponding to a relatively low range of bounce rates; and
   displaying a first indicia so that it aligns relative to said first zone or said second zone to convey a relative value of said bounce rate.

3. The non-transitory computer-readable medium of claim 2, wherein said step of displaying said first bar comprises:
   displaying said first zone in a first particular color; and
   displaying said second zone in a second particular color.

4. The non-transitory computer-readable medium of claim 3, wherein said first bar comprises a first set of three zones, which include said first zone and said second zone.

5. The non-transitory computer-readable medium of claim 4, wherein:
   said three zones within said first set of zones are colored green, yellow, and red, respectively.

6. The non-transitory computer-readable medium of claim 5, wherein:
   said green zone within said first set of zones corresponds to a relatively low range of bounce rates;
   said yellow zone within said first set of zones corresponds to an intermediate range of bounce rates; and
   said red zone within said first set of zones corresponds to a relatively high range of bounce rates.

7. The non-transitory computer-readable medium of claim 1, wherein said first traffic source is selected from the group consisting of: (1) a television advertisement; (2) radio advertisement; and (3) a print media advertisement.

8. The non-transitory computer-readable medium of claim 7, wherein said first traffic source comprises a television advertisement.

9. The non-transitory computer-readable medium of claim 1, wherein said one or more particular user activities are selected from the group consisting of: (1) entering information;
   (2) requesting information; and (3) making a purchase.

10. The non-transitory computer-readable medium of claim 9, wherein said conversion value comprises a sum of said numerical values of said one or more particular user activities for each of said plurality of user visits.

11. The non-transitory computer-readable medium of claim 1, wherein said stored goal value consists of a predetermined number set by a web site administrator.

12. A non-transitory computer-readable medium storing computer-executable instructions for:
   (A) receiving first traffic source information indicating that a first plurality of user visits to a web site originated from a first traffic source, wherein said first traffic source is selected from the group consisting of:
      i) a television advertisement;
      ii) a radio advertisement; and
      iii) non-electronic media;
   (B) receiving information regarding which of said first plurality of user visits included one or more particular user activities;
   (C) determining, for each visit of the plurality of user visits, whether a conversion resulted from a particular visit of said first plurality of user visits by:
      i) using a numerical value associated with each of said one or more particular user activities to determine a conversion value, wherein using said numerical value associated with each of said one or more particular user activities to determine said conversion value comprises summing said numerical value of each of said one or more particular user activities; and
      ii) determining that said conversion value is greater than or equal to a stored threshold value; and
   (D) determining a first bounce rate percentage associated with said first traffic source at least partially based on:
      i) the number of visits of the plurality of user visits that did not result in said conversion; and
      ii) the total number of said first plurality of user visits;
   (E) transmitting for display on a display medium:
      i) an indication of said first traffic source;

ii) an indication of which of said first plurality of user visits included said one or more particular user activities;

iii) an indication showing which of said first plurality of user visits resulted in said conversion;

iv) a first bar comprising at least a first zone and a second zone, said first zone corresponding to a relatively high range of bounce rate percentages, and said second zone corresponding to a relatively low range of bounce rate percentages; and v) a first indicia that aligns relative to said first zone or said second zone to convey a relative value of said first bounce rate percentage.

13. The non-transitory computer-readable medium of claim 12, wherein said first traffic source comprises a television advertisement.

14. The non-transitory computer-readable medium of claim 12, wherein said first traffic source comprises a radio advertisement.

15. The non-transitory computer-readable medium of claim 12, wherein said first traffic source comprises a print media advertisement.

16. The non-transitory computer-readable medium of claim 12, wherein:
   (A) said one or more particular user activities comprise a first particular user activity and a second particular user activity;
   (B) a first numerical value is associated with said first particular user activity;
   (C) a second numerical value is associated with said second particular user activity; and
   (D) said step of summing said numerical value of each of said one or more particular user activities comprises summing:
      i) said first numerical value; and
      ii) said second numerical value.

17. A computer system comprising:
   at least one processor, wherein the computer system is configured for:
      (A) receiving first traffic source information indicating that a first plurality of user visits to a web site originated from a first traffic source, wherein said first traffic source is selected from the group consisting of:
         i) a television advertisement;
         ii) a radio advertisement; and
         iii) a print media advertisement;
      (B) receiving information regarding which of said first plurality of user visits included one or more particular user activities;
      (C) determining if a conversion resulted from a particular visit of said first plurality of user visits, wherein determining if said conversion resulted from said particular visit comprises:
         i) using a numerical value associated with each of said one or more particular user activities to determine a conversion value, wherein:
            (1) said numerical value associated with each of said one or more particular user activities is between about 0 and about 5; and
            (2) using said numerical value associated with each of said one or more particular user activities to determine said conversion value comprises summing said numerical value of each of said one or more particular user activities; and
         ii) comparing said conversion value with a stored goal value to determine whether a particular conversion occurred during said particular visit;
      (D) determining a first bounce rate percentage associated with said first traffic source, wherein determining said first bounce rate percentage comprises:
         the number of said first plurality of user visits that did not result in said conversion divided by a total number of said first plurality of user visits; and
      (E) transmitting, to a client device, one or more indications of:
         i) said first traffic source;
         ii) the number of said first plurality of user visits that included one or more particular user activities;
         iii) which of said first plurality of user visits resulted in said conversion; and
         iv) said first bounce rate percentage,
      wherein said client device is configured to display:
         (1) a first bar comprising at least a first zone and a second zone, said first zone corresponding to a relatively high range of bounce rates, and said second zone corresponding to a relatively low range of bounce rates; and
         (2) a first indicia so that it aligns relative to said first zone or said second zone to convey a relative value of said first bounce rate.

18. The computer system of claim 17, wherein said step of transmitting said one or more indications to said client device comprises transmitting to a user interface viewable by a web site administrator.

* * * * *